(12) United States Patent
Jarasson et al.

(10) Patent No.: US 10,086,800 B2
(45) Date of Patent: Oct. 2, 2018

(54) SYSTEM FOR DISTRIBUTING WASHER FLUID FOR MOTOR VEHICLE WINDSCREEN WIPERS

(71) Applicant: Valeo Systèmes d'Essuyage, Le Mesnil Saint Denis (FR)

(72) Inventors: Jean-Michel Jarasson, Le Mesnil Saint Denis (FR); Vincent Izabel, Chilly Mazarin (FR); Gérald Caillot, Cernay la Ville (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 311 days.

(21) Appl. No.: 14/652,268

(22) PCT Filed: Dec. 17, 2013

(86) PCT No.: PCT/EP2013/077009
§ 371 (c)(1),
(2) Date: Jun. 15, 2015

(87) PCT Pub. No.: WO2014/095945
PCT Pub. Date: Jun. 26, 2014

(65) Prior Publication Data
US 2015/0375718 A1   Dec. 31, 2015

(30) Foreign Application Priority Data
Dec. 18, 2012   (FR) ..................................... 12 62277

(51) Int. Cl.
*B60S 1/48*   (2006.01)
*B60S 1/52*   (2006.01)
(Continued)

(52) U.S. Cl.
CPC ............... *B60S 1/488* (2013.01); *B60S 1/524* (2013.01); *H05B 3/0014* (2013.01); *H05B 3/06* (2013.01);
(Continued)

(58) Field of Classification Search
CPC ........ B60S 1/488; B60S 1/524; C07K 14/315; C12C 1/689; H05B 3/0014; H05B 3/06; H05B 3/146; H05B 3/18; H05B 3/58
(Continued)

(56) References Cited

U.S. PATENT DOCUMENTS

| 4,323,088 A | * | 4/1982 | McClellan | ............ F16L 59/135 |
| | | | | 138/106 |
| 5,539,951 A | * | 7/1996 | Guell | .................... B60S 1/3805 |
| | | | | 15/250.02 |

(Continued)

FOREIGN PATENT DOCUMENTS

| DE | 39 25 038 A1 | 1/1991 | |
| FR | 2971471 A1 | * 8/2012 | .............. B60S 1/482 |

OTHER PUBLICATIONS

FR2971471 English Machine Translation.*
(Continued)

*Primary Examiner* — Tu B Hoang
*Assistant Examiner* — Vy Nguyen
(74) *Attorney, Agent, or Firm* — Osha Liang LLP

(57) ABSTRACT

A system of motor vehicle windscreen wipers including at least one fluid circulation pipe, at least one heating element extending along said pipe, and at least one hydraulic connection connected hydraulically to said pipe. Additionally, the system includes a heat-conducting adapter in contact with said heating element. Furthermore, the heat-conducting
(Continued)

Figure 9:
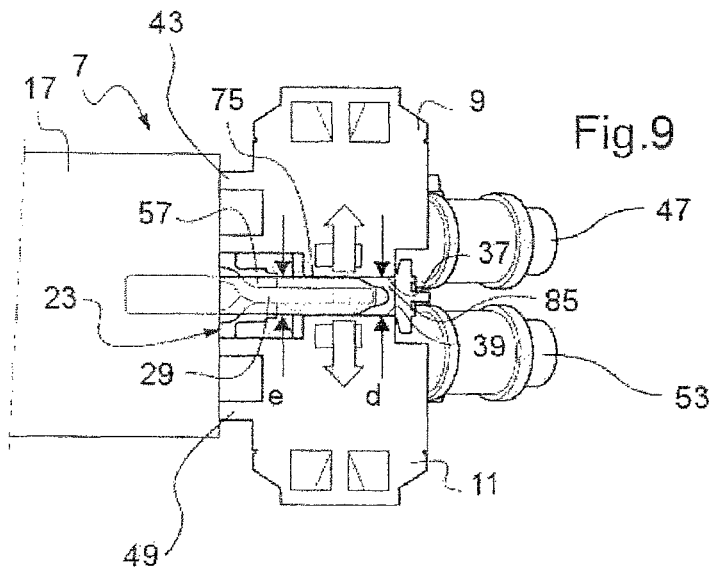

adapter is arranged at a suitable distance to transmit at least some of the heat from said adapter to said hydraulic connection.

9 Claims, 5 Drawing Sheets

(51) Int. Cl.
    *H05B 3/00*         (2006.01)
    *H05B 3/06*         (2006.01)
    *H05B 3/14*         (2006.01)
    *H05B 3/18*         (2006.01)
    *H05B 3/58*         (2006.01)

(52) U.S. Cl.
    CPC ............... *H05B 3/146* (2013.01); *H05B 3/18* (2013.01); *H05B 3/58* (2013.01)

(58) Field of Classification Search
    USPC .......... 219/202, 204; 435/252.3, 320.1, 69.1, 435/6.15; 536/23.7, 24.32
    See application file for complete search history.

(56) References Cited

U.S. PATENT DOCUMENTS

| | | | |
|---|---|---|---|
| 5,699,581 A * | 12/1997 | Heneghan | B60S 1/3805 15/250.01 |
| 7,875,835 B2 * | 1/2011 | Tanaka | H05B 3/54 138/33 |
| 2002/0000481 A1 * | 1/2002 | Utz | B60S 1/522 239/284.1 |
| 2012/0167327 A1 * | 7/2012 | Kasack | B60S 1/488 15/250.04 |
| 2012/0192375 A1 | 8/2012 | Cathala et al. | |
| 2014/0259503 A1 * | 9/2014 | Caillot | B60S 1/488 15/250.01 |

OTHER PUBLICATIONS

14652268_Oct. 23, 2017_FR_2971471 English Machine Translation.*
International Search Report issued in PCT/EP2013/077009 dated Jan. 21, 2014 (2 pages).

* cited by examiner

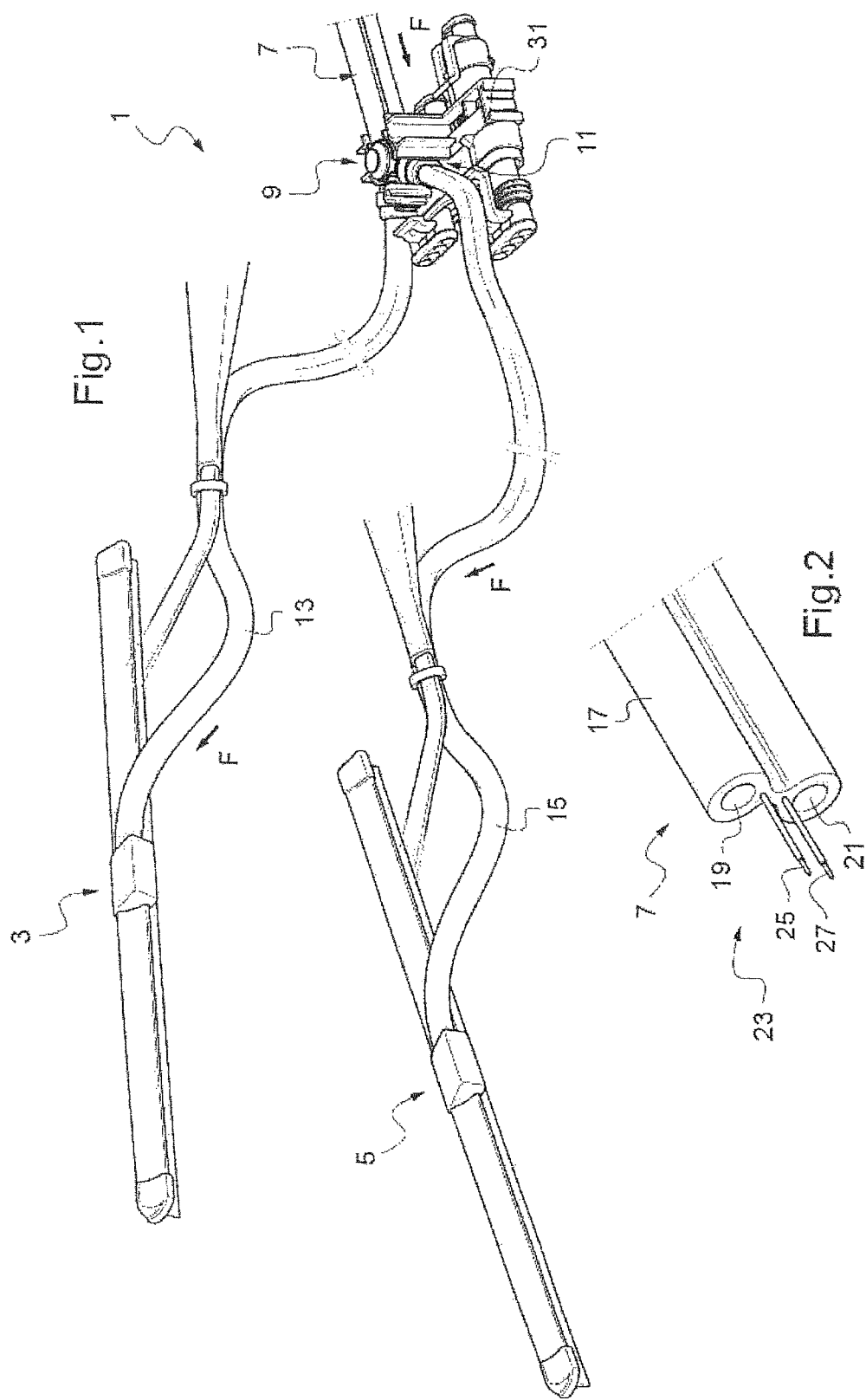

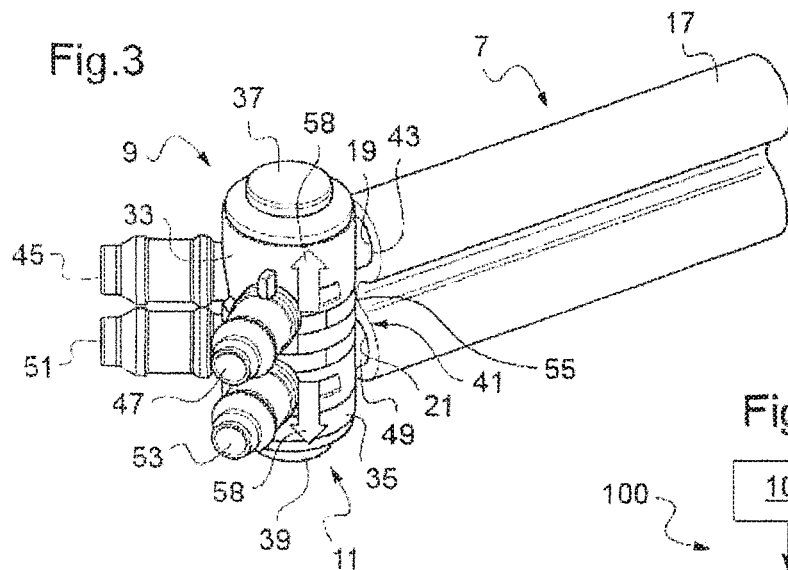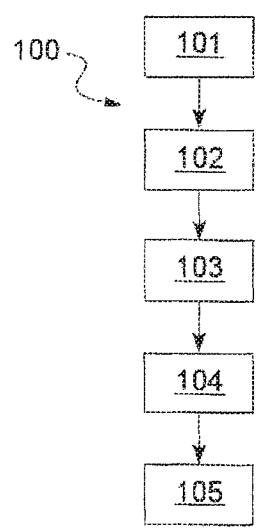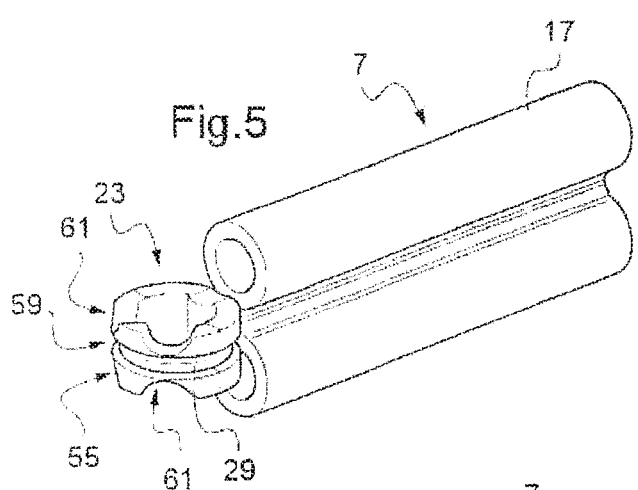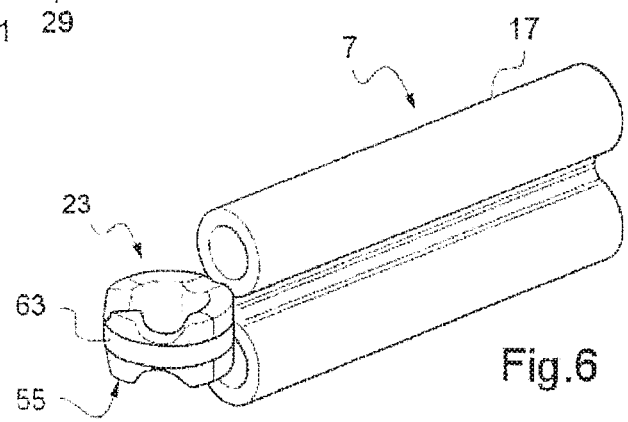

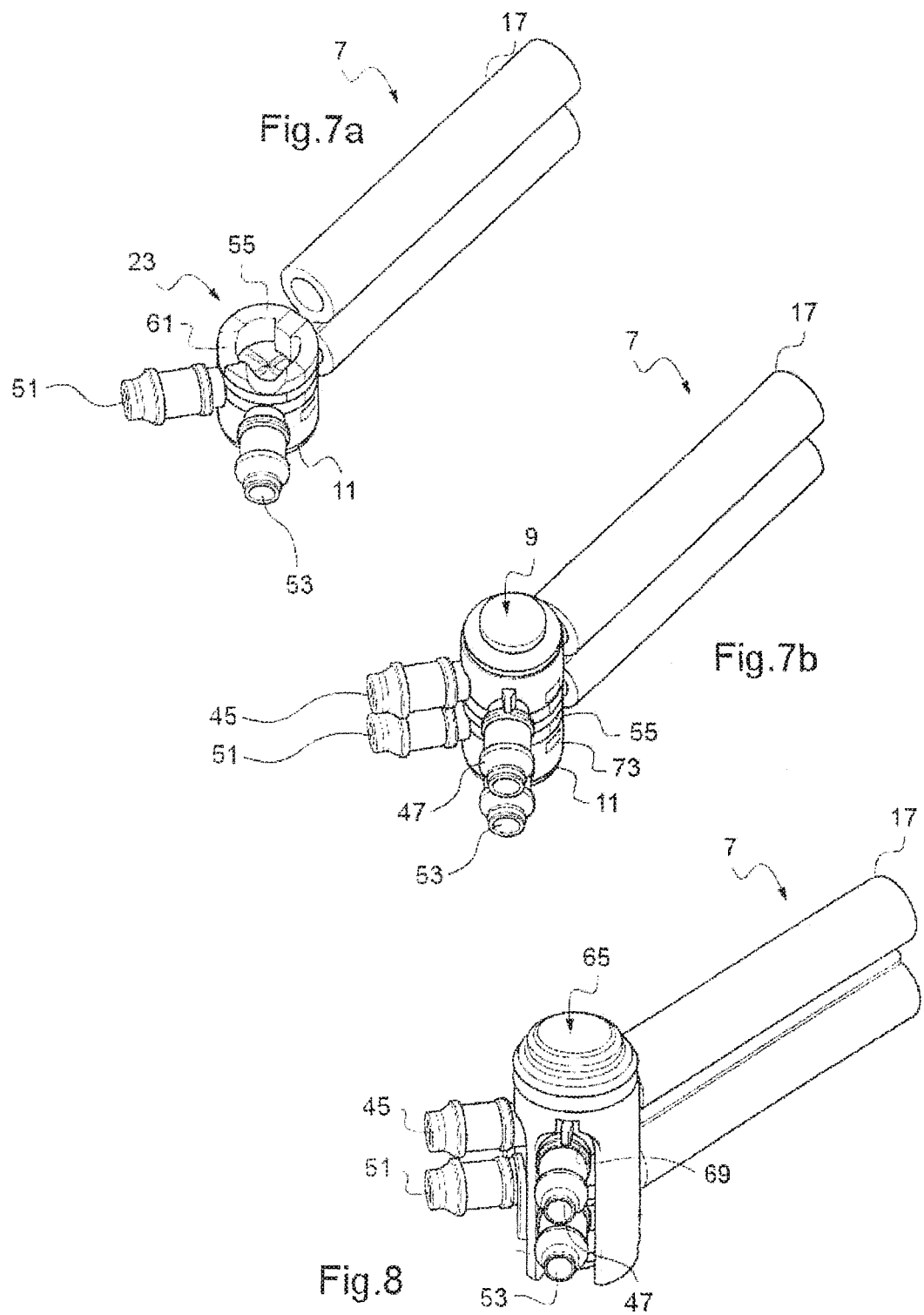

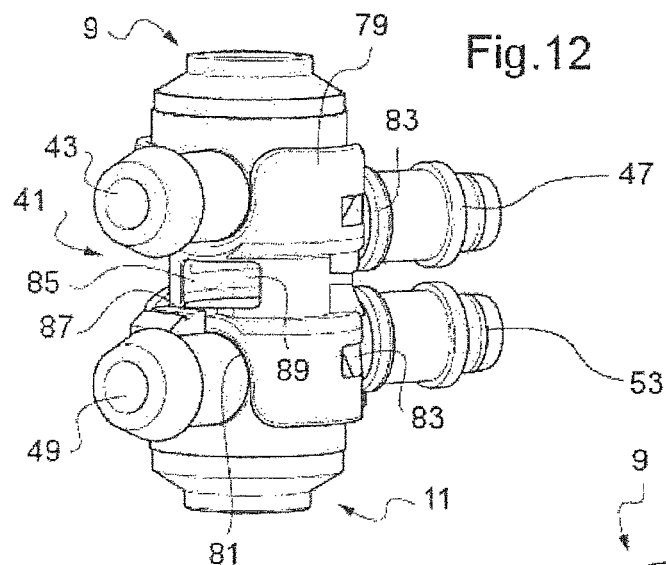
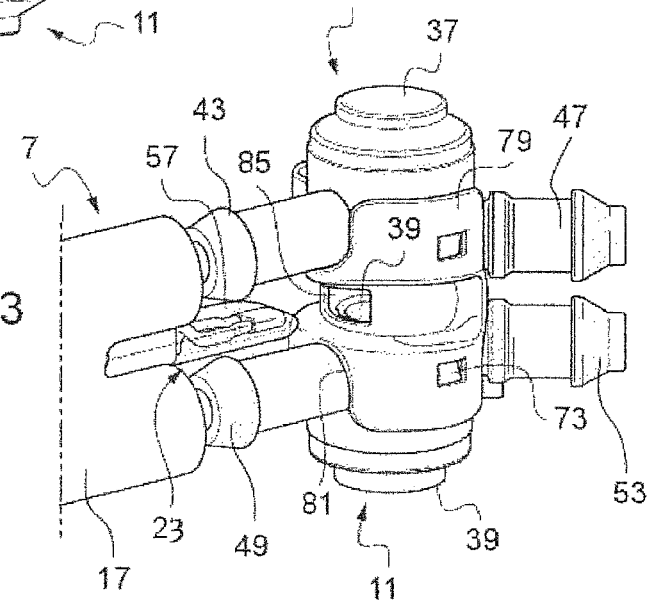
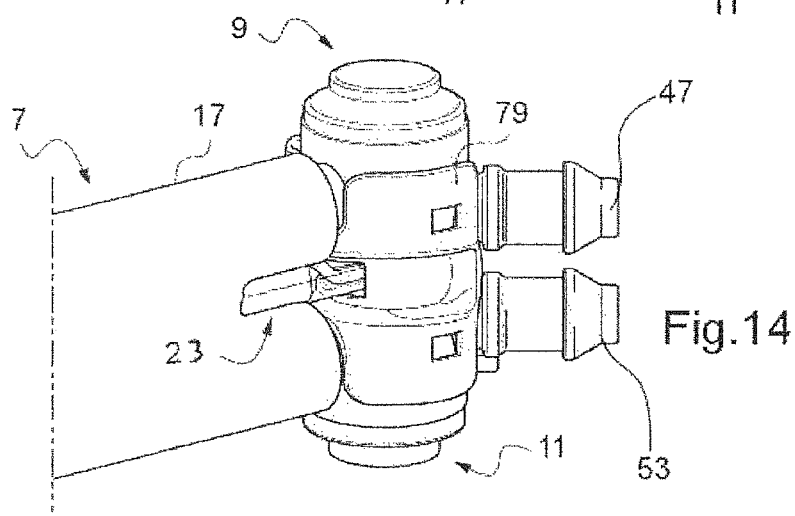

SYSTEM FOR DISTRIBUTING WASHER FLUID FOR MOTOR VEHICLE WINDSCREEN WIPERS

The present invention relates to a system for distributing washer fluid for motor vehicle windscreen wipers in which the washer fluid is heated/thawed before being projected onto the glazed surface of the motor vehicle. The invention applies more specifically to a system for distributing washer fluid for motor vehicle windscreen wipers with two spray lines enabling the hydraulic connection of the washer fluid distribution system to be heated.

In a known manner, the windscreen wiper includes two spray lines provided with one or more pressurized spray orifices or nozzles enabling the distribution of washer fluid on the glazed surface. The nozzles are supplied with washer fluid contained in a reservoir using a pump.

If the outside temperature is too low, for example below 5° C., the washer fluid is heated/thawed. To do so, a heated feed pipe provides a thawing function and keeps the washer fluid distribution system free from ice. To actually heat the washer fluid, a network of heating and feed pipes is used, each pipe having an extruded sleeve of circulation channels and in which the electrical heating conductors are embedded in the mass. Thus, the washer fluid is heated and ducted in the pipe to the nozzle(s) with no obstacles in the circulation channel of the washer fluid, while limiting the size and cost of the pipe.

The network includes a main under-hood pipe connected at one end to a washer fluid pump of the motor vehicle and at the other end to two secondary windscreen wiper pipes connected respectively to the spray lines of the wipers via a hydraulic connection. The main pipe and the hydraulic connection are arranged beneath the hood of the motor vehicle, i.e. in the engine compartment of the motor vehicle, while the secondary windscreen wiper pipes are built into the wiper arms, mainly outside the engine compartment.

This junction zone between the main under-hood pipe and the secondary windscreen wiper pipes is used to position the hydraulic connection. However, this junction zone creates a cold zone that may disturb circulation of the washer fluid in the presence of ice, or even block same completely.

One of the objectives of the present invention is to overcome these drawbacks by proposing an improved washer fluid distribution system for motor vehicle windscreen wipers that has no cold zones at the junction between the main under-hood pipe and the secondary windscreen wiper pipes, and that is cheap and small. Another purpose of the present invention is to propose a simple method for assembling the heating device with the distribution system.

For this purpose, the present invention relates to a washer fluid distribution system for motor vehicle windscreen wipers comprising:
- at least one fluid circulation pipe,
- at least one heating element extending along said pipe,
- at least one hydraulic connection connected hydraulically to said pipe, characterized in that it includes a heat-conducting adapter in contact with said heating element and arranged at a suitable distance to transmit at least some of the heat from said adapter to said hydraulic connection.

Such a system enables the hydraulic connection to be heated efficiently, firstly by increasing the heat transfer between the heating element and the hydraulic connection, and secondly by uniformly distributing this heat transfer over the body of the hydraulic connection. This prevents the formation of cold zones that could disturb circulation of the washer fluid, and hotspots that could damage the hydraulic connection.

According to one or more features of the distribution system, taken individually or in combination:
- the distance between the heat-conducting adapter and the hydraulic connection is between 0 and 5 millimeters, and is preferably between 0 and 1 millimeter,
- the heat-conducting adapter includes a wall portion fitting at least one portion of the body of said hydraulic connection,
- the heating element includes two separate heating conductors connected to one another such as to form a conductive heating loop,
- the two heating conductors are partially embedded in the mass forming said circulation pipe, said conductive heating loop extending outside said pipe,
- the heat-conducting adapter is a heat-conducting ring about which the heating loop is wound,
- the heat-conducting ring is covered by an insulating joint at least about the heating loop,
- the heat-conducting adapter is a heat-conducting tab wrapped around the conductive heating loop,
- the heat-conducting tab is made of heat-conducting resin,
- a protective mask covers the heat-conducting adapter as well as a side wall of the hydraulic connection,
- the distribution system includes two hydraulic connections,
- the heat-conducting adapter is arranged at a junction zone of the two hydraulic connections,
- the heat-conducting ring is fitted onto the body of the two hydraulic connections at the junction zone,
- a supporting element connects the two hydraulic connections and the heat-conducting tab is inserted between the bodies of the two hydraulic connections at the junction zone in a cavity in said supporting element,
- the hydraulic connection includes a check valve.

The invention also relates to a method for assembling the heating device including a heat-conducting ring, characterized in that it includes the following steps:
- an insulating joint is placed about a heat-conducting ring at least about a conductive heating loop,
- the heat-conducting ring is fitted into the body of the at least one hydraulic connection, and
- a resin is applied to cover the heat-conducting ring and the body of the at least one hydraulic connection.

The invention also relates to a method for assembling the heating device comprising two hydraulic connections, characterized in that it includes the following step: the heat-conducting ring is fitted at the junction zone of the bodies of the hydraulic connections.

The method may also include the following step: a protective mask is fitted onto the side walls of the bodies of the check valves.

The invention also relates to a method for assembling the heating device including a heat-conducting tab, characterized in that it includes the following steps:
- a heat-conducting tab is wrapped around the conductive heating loop,
- the heat-conducting tab is arranged against the body of the hydraulic connection.

The invention also relates to a method for assembling the heating device including two hydraulic connections, characterized in that it includes the following steps:
- the two hydraulic connections are assembled using a supporting element, the heat-conducting tab is inserted between the two assembled hydraulic connections.

The assembly method may also include the following step: a protective mask is fitted to the side walls of the at least one hydraulic connection.

Figure 11:
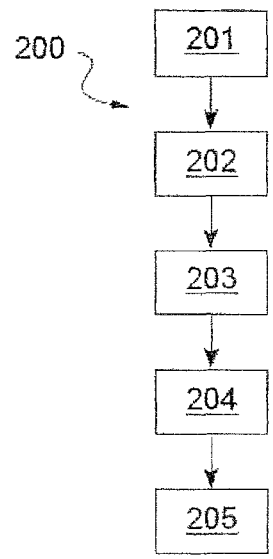
Figure 10:
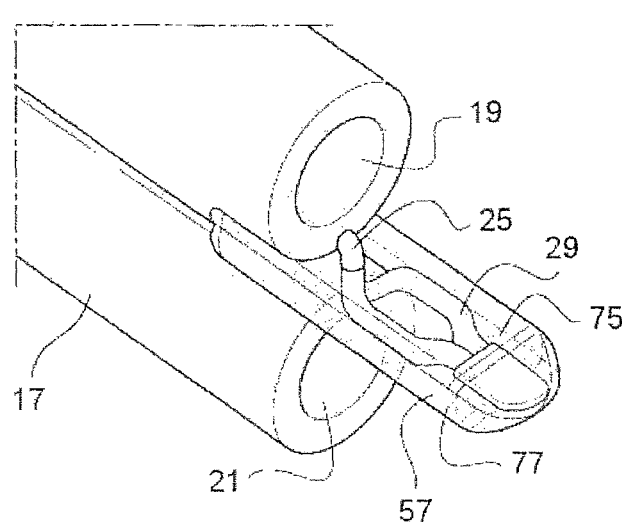

Other features and advantages of the invention are given in the description below, which is provided as a non-limiting example with reference to the attached drawings, in which:

FIG. 1 is a schematic view of elements of a washer fluid distribution system for motor vehicle windscreen wipers, FIG. 2 is a cross-section of a main under-hood pipe of the distribution system in FIG. 1, as well as the elements of a heating device, FIG. 3 shows a main under-hood pipe connected to two hydraulic connections on completion of a method for assembling a first embodiment of the heating device, FIG. 4 is an organizational diagram of the different steps of the method for assembling the first embodiment of the heating device, FIG. 5 shows the main under-hood pipe assembled with a heat-conducting ring on completion of a second step of the method for assembling the first embodiment of the heating device, FIG. 6 shows the heat-conducting ring assembled with a joint and the main under-hood pipe on completion of a third step of the method for assembling the first embodiment of the heating device, FIG. 7a shows a first hydraulic connection assembled with the heat-conducting ring and the main under-hood pipe during a fourth step of the method for assembling the first embodiment of the heating device, FIG. 7b shows the two hydraulic connections assembled with the heat-conducting ring and the main under-hood pipe on completion of a fourth step of the method for assembling the first embodiment of the heating device, FIG. 8 shows a protective mask covering the two hydraulic connections on completion of a sixth step of the method for assembling the first embodiment of the heating device, FIG. 9 is a cross-section of the main under-hood pipe connected to two hydraulic connections and assembled with the heating device on completion of a method for assembling a second embodiment of the heating device, FIG. 10 shows the heating device according to the second embodiment assembled with the main under-hood pipe, FIG. 11 is an organizational diagram of the different steps of the method for assembling the second embodiment of the heating device, FIG. 12 shows the two hydraulic connections held together by a supporting element according to the second embodiment of the heating device, FIG. 13 shows the heating device aligned with the two hydraulic connections before assembly, FIG. 14 shows the heating device assembled with the hydraulic connections as obtained on completion of a method for assembling the second embodiment of the heating device.

In these figures, identical elements have the same reference signs.

FIG. 1 is a general schematic view of elements of a washer fluid distribution system 1 for motor vehicle windscreen wipers 3, 5. The attached figures show a washer fluid distribution system 1 including two spray lines, also referred to as a two-line distribution system. Naturally, it is also entirely possible for there to be only one spray line, this system also being called a single-line distribution system.

According to a first variant, referred to as the two-line variant, the washer fluid distribution system 1 includes two spray lines, this distribution system being referred to as a two-line distribution system. The two-line windscreen wipers 3, 5 have a spray line on each side of the windscreen wiper arm (not shown), each line extending along the longitudinal direction of the wiper. Preferably, the washer fluid is sent only to the front portion of the wiper, i.e. the washer liquid is sent to the spray line located on the side towards which the wiper arm moves during a rising phase of the wiper action, and the other side during the descending phase of the wiper action. This layout enables the washer fluid to be wiped away as soon as it is deposited on the glazed surface, thereby eliminating any period during which visibility may be reduced.

According to a second variant (not shown), referred to as the single-line variant, the washer fluid distribution system 1 includes a single spray line, this distribution system being referred to as a single-line distribution system.

The washer fluid distribution system 1 includes a main under-hood pipe 7 designed to be connected to a washer fluid pump of the motor vehicle (not shown), which is in turn connected to a reservoir (not shown), at least one hydraulic connection 9, 11 to connect the main under-hood pipe 7 to the secondary windscreen wiper pipes 13 and 15 respectively connected to the spray lines of the windscreen wipers 3, 5 of the motor vehicle. According to the single-line variant, the washer fluid distribution system 1 includes a first hydraulic connection 9. According to the two-line variant, the washer fluid distribution system 1 includes the first hydraulic connection 9 and a second hydraulic connection 11.

The main under-hood pipe 7 and the at least one hydraulic connection 9, 11 are arranged beneath the hood of the motor vehicle, i.e. in the engine compartment, while the secondary windscreen wiper pipes 13, 15 are arranged in part on the outside, built into the arms holding the windscreen wipers 3, 5 and connected to said wipers. The at least one hydraulic connection 9, 11 is assembled in a housing 31 of the motor vehicle, which enables it to be held firm in the vehicle.

In the example presented, the at least one hydraulic connection 9, 11 includes at least one check valve. The at least one check valve enables the liquid pumped to flow in the direction of circulation from the pump towards the line (see arrows F) and prevents the pumped liquid from flowing back in the other direction, i.e. from the wipers towards the pump. The at least one check valve thereby prevents any liquid from flowing back from the windscreen wipers towards the pump, in particular during a phase in which fluid distribution in a circulation channel is stopped. It is naturally possible to use other types of hydraulic connection, such as "T" or "Y" hydraulic connections.

As shown in the cross-section of the main under-hood pipe 7 in FIG. 2, according to the two-line variant, said pipe includes an extruded sleeve 17 with two circulation channels 19, 21. Furthermore, a heating device 23 is placed in the sleeve 17. The heating device 23 includes two heating conductors 25, 27 embedded in the mass of the sleeve 17. In the example embodiment shown in FIG. 2, the heating conductors are aligned in the center between the circulation channels 19, 21. The heating conductors 25, 27 and the circulation channels 19, 21 are longitudinally substantially parallel to one another.

According to the single-line variant, the sleeve 17 has just one circulation channel.

The heating conductors 25, 27 include for example a resistive heating wire such that the washer fluid drawn from the reservoir by the pump(s) towards the respective spray line is heated.

The heating conductors 25, 27 are connected to an electricity supply on the pump side. On the other side, i.e. the side of the hydraulic connection 9, 11, the heating conductors 25, 27 are connected together using shunts (not shown), which makes it possible to form a conductive heating loop 29 (shown for example in FIG. 5) thereby closing an electrical heating circuit.

The sleeve 17 is made of a soft material, for example rubber. The circulation channels 19, 21 for the washer fluid and the heating conductors 25, 27 are obtained by extrusion: the heating conductors 25, 27 are inserted during extrusion of the sleeve.

The secondary windscreen wiper pipes 13, 15 (FIG. 1) are based on the same principle as the main under-hood pipe 7. They each have an extruded sleeve with one circulation channel and two heating conductors embedded in the mass of the sleeve (not shown).

The heating device 23 also includes a heat-conducting adapter 55 (the adapter indicated using reference sign 55 is shown in FIGS. 3, 5, 6, 7a and 7b), 57 (the adapter indicated using reference sign 57 is shown in FIGS. 9, 10 and 13) in contact firstly with the heating loop 29 (see FIG. 5) and secondly with the at least one hydraulic connection 9, 11. The heat-conducting adapter 55, 57 has a uniform contact surface with the at least one hydraulic connection 9, 11.

The heat-conducting adapter 55, 57 is made of material enabling good heat diffusion. The advantageous heat diffusion properties of the heat-conducting adapter 55, 57 enable the heat to be diffused efficiently from the conducting loop 29 to at least one hydraulic connection 9, 11. The transfer of heat between the adapter 55, 57 and the at least one hydraulic connection 9, 11 is shown by the arrows 58. The heat-conducting adapter 55, 57 enables the heat to be transferred to the at least one hydraulic connection 9, 11 uniformly, thereby preventing the creation of hotspots that could damage the at least one hydraulic connection 9, 11. Hotspots means zones where the temperature is such that it could damage the at least one hydraulic connection 9, 11.

Advantageously, the heat-conducting adapter 55, 57 may have a wall, the shape of which fits the body or bodies of the hydraulic connection(s), thereby improving the contact between the heat-conducting adapter 55, 57 and the at least one hydraulic connection 9, 11, which enables even more heat to be transferred from the heating loop 29.

As shown in FIG. 3, each hydraulic connection 9, 11 includes a body of a hydraulic connection having a generally cylindrical shape made of a material designed to withstand the heating temperatures, for example plastic.

The bodies of the first hydraulic connection 9 and of the second hydraulic connection 11 have a side wall 33, 35 and two substantially circular faces 37, 39 (only one face of each hydraulic connection is visible). The bodies of the hydraulic connections can be separate elements. These separate elements may be assembled coaxially. In this case, the faces 37, 39 of the hydraulic connection face one another in a junction zone 41. The bodies of the hydraulic connections can also be formed from a single part.

The body of the first hydraulic connection 9 includes a first inlet 43 connected to the first circulation channel 19 of the main under-hood pipe 7 and two first outlets 45, 47 intended to be connected to the first circulation channels of the secondary windscreen wiper pipes 13 and 15. The body of the second hydraulic connection 11 includes a second inlet 49 connected to the second circulation channel 21 of the main under-hood pipe 7 and two second outlets 51, 53 intended to be connected to the two circulation channels of the two secondary windscreen wiper pipes 13, 15.

The inlets 43, 49 and outlets 45, 47, 51, 53 of the hydraulic connections 9, 11 include quick connectors. The quick connectors include annular grooves sunk into the circulation channels of the pipes, for connection purposes.

According to the two-line variant, the heat-conducting adapter 55, 57 is located at the junction zone 41 of the two hydraulic connections 9, 11. According to a first embodiment, the heat-conducting adapter 55, 57 is a heat-conducting ring 55. The heat-conducting ring 55 is for example made of metal, such as aluminum or stainless steel, or of a heat-conducting plastic.

As shown more clearly in FIG. 5, according to the two-line variant, the heat-conducting ring 55 has an internal wall the shape of which fits the shape of the bodies of the hydraulic connectors 9, 11 at the junction zone 41.

Furthermore, the heat-conducting ring 55 has a peripheral positioning slot 59 designed to receive the heating loop 29. The heating loop 29 may form one or more windings about the heat-conducting ring 55.

The heat-conducting ring 55 also includes openings 61 for the inlets 43, 49 and the outlets 45, 47, 51, 53 of the at least one hydraulic connection 9, 11.

The heat-conducting ring 55 is held on the main under-hood pipe 7 for example by the conductive loop 29, by clips or by clamping means (not shown).

The distribution system 1 may include a thermal insulator covering the heat-conducting ring 55. The thermal insulator includes for example an insulating joint 63 (FIG. 6). The insulating joint 63 encapsulates the heating loop 29 to prevent heat being transferred to the external elements and to protect same physically from incorrect handling which could completely cut off the heating from the main under-hood pipe 7.

The heating device 23 assembled with the distribution system 1 according to the first embodiment and according to the two-line variant is shown in FIG. 3. In this FIG. 3, the hydraulic connections 9, 11 are fitted into the heat-conducting ring 55, a portion of the internal wall of the ring is then in contact with each of the bodies of the hydraulic connectors. The inlets 43, 49 are connected to the circulation channels 19, 21 of the main under-hood pipe 7.

When in use, in a first direction of the windscreen wiper, for example in a rising phase of the wiper action, the pump distributes the washer fluid to the first circulation channel 19 of the main under-hood pipe 7, then to the first circulation channels of the secondary pipes of the windscreen wipers 3, 5 and supplies the first spray lines of the two windscreen wipers 3, 5 with washer fluid contained in the reservoir via the first hydraulic connection 9 and the pump. If the distribution system is a two-line system, the second circulation channel 21 of the main under-hood pipe 7 also supplies the second spray lines of the two windscreen wipers 3, 5 with washer fluid via the second hydraulic connection 11 and the pump such as to spray the windscreen when the windscreen wipers move in the opposite direction. A two-way pump or two one-way pumps (not shown) can be used for each spray line.

The heating conductors 25, 27 heat the sleeve 17 which in turn heats the washer fluid when same is flowing through the at least one circulation channel 19, 21 between the pump and the at least one hydraulic connection 9, 11. The heat-conducting ring 55 heats the body of the at least one hydraulic connection 9, 11, as per the arrows 58, thereby preventing the formation of a cold zone which could disturb circulation of the washer fluid. The uniformity of the heating also prevents the formation of hotspots which could damage the at least one hydraulic connection 9, 11.

According to a variant, the thermal insulator of the distribution system 1 may include a foam or a resin to thermally insulate the heated zone of the outside in order to improve the quality of the heating between the heat-conducting ring 55 and the body of the at least one hydraulic connection 9, 11, which improves the quality of the deicing. The thermal insulation provided in resin form makes it possible to attach the heat-conducting ring 55 to the body of the at least one hydraulic connection 9, 11. Furthermore, the thermal insulator provided in resin form also makes it possible to bond the bodies of the hydraulic connections 9, 11 together in the two-line variant.

Furthermore, a protective mask 65 may be fitted onto the body of the at least one hydraulic connection and the heat-conducting ring 55 (FIG. 8).

The protective mask 65 makes it possible to physically protect the heat-conducting ring 55 from incorrect handling that could completely cut off the heating from the main under-hood pipe 7. Equally, the protective mask 65 makes it possible to protect people from the risk of burning when working underneath the hood of the vehicle. The protective mask 65 also helps to keep the heat-conducting ring 55 on the body of the at least one hydraulic connection 9, 11 in the assembly steps in the housing 31 of the motor vehicle. Furthermore, the protective mask 65 helps to improve the thermal insulation, which increases heating efficiency.

The protective mask 65 may include retaining means cooperating by elastic fastening with the body of the at least one hydraulic connection 9, 11. For example, the protective mask 65 is made of plastic and has a general staple shape deforming elastically to clip the side faces of the bodies of the at least one hydraulic connection 9, 11. Thus, the protective mask 65 has flaps that may include lugs (not shown) cooperating with the grooves of the quick connectors for the inlets 43, 49 of the at least one hydraulic connection 9, 11 to attach the protective mask 65.

The protective mask 65 also includes openings 69 for the inlets 43, 49 and the outlets 45, 47, 51, 53 of the at least one hydraulic connection 9, 11.

During the assembly method of the heating device according to a first embodiment 100 (FIG. 4), the following succession of steps can be carried out.

In a first step 101, the two heating conductors 25, 27 extending outside the sleeve 17 are connected together using shunts. This creates a conductive heating loop 29 that closes the electrical circuit of the heating device 23.

Subsequently, in a second step 102, shown in FIG. 5, the conductive heating loop 29 is wound about the heat-conducting ring 55 in the positioning slot 59 of the ring. The conductive heating loop 29 can be wound one or more times about the heat-conducting ring 55.

In a third step 103, shown in FIG. 6, a joint 63 is positioned about the heat-conducting ring 55 at least about the conductive heating loop 29. This encapsulates the conductive heating loop 29.

In a fourth step 104, in the single-line variant, the heat-conducting ring 55 is fitted into the hydraulic connection 9 at a face 37 and same is connected to the circulation channel 19 of the main under-hood pipe 7.

In the two-line variant, the heat-conducting ring 55 is fitted into a first hydraulic connection 9 or 11 at a face 37 or 39 (FIG. 7a), then the first hydraulic connection 9 or 11 is connected to a circulation channel 19 or 21 of the main under-hood pipe 7 via the inlet 43 or 49 of the first hydraulic connection 9 or 11. The same is then performed for the second hydraulic connection 11 9 (FIG. 7b). The heat-conducting ring 55 is thus positioned at the junction zone 41 of the two hydraulic connections 9, 11.

Subsequently, in a fifth step 105, a resin is poured onto the heat-conducting ring 55 and the body of the at least one hydraulic connection to cover the heat-conducting ring 55. This holds the heat-conducting ring 55 against the body of the hydraulic connection.

In a sixth step, the protective mask 65 is fitted onto the body of the at least one hydraulic connection. To do so, the inlets 43, 49 and outlets 45, 47, 51, 53 of the at least one hydraulic connection 9, 11 are slid into the openings 69.

As an alternative to the fifth and sixth steps described above, a protective mask 65 including a thermal insulator bonded to the inside face, such as a protective mask 65 pre-fitted with an insulating foam, is fitted onto the body of the at least one hydraulic connection 9, 11.

In a seventh step, the at least one hydraulic connection 9, 11 is assembled with the housing 31. The distribution system 1 connected thus is attached to the motor vehicle. It is then simply a matter of connecting the secondary windscreen wiper pipes 13, 15 to the at least one hydraulic connection 9, 11 and electrically connecting the heating conductors 25, 27 of the main under-hood pipe 7 to the electricity supply connector of the housing 31.

According to a second embodiment shown in FIG. 9, the heat-conducting ring 55 is replaced by a conductive heating adapter including a heat-conducting tab 57 having a wall fitting the shape of the body of the at least one hydraulic connection 9, 11. The heat-conducting tab 57 is for example made of a heat-diffusing resin.

As shown more clearly in FIG. 10, the heating loop 29 including the heating conductors 25, 27 is wrapped in the heat-conducting tab 57. Thus, the heating loop 29 transfers the heat to the heat-conducting resin tab 57. The heat-conducting tab 57 is obtained for example by molding resin about the heating loop 29. The shape of the heat-conducting tab 57 is designed to fit the body of the at least one hydraulic connection 9, 11. For example, the heat-conducting tab 57 can be placed on the upper or lower face of the hydraulic connection.

With reference to FIG. 9 showing the second embodiment of the two-line variant, the heat-conducting tab 57 is inserted between the two opposing faces 37, 39 of the hydraulic connections 9, 11 at the junction zone 41. The walls of the heat-conducting tab 57 are in contact with the faces 37, 39. In this example, these are the upper and lower walls 75, 77 of the tab. Thus, the heat-conducting tab 57 transfers the heat to the body of the hydraulic connection 9, 11.

In the example shown, the two hydraulic connections 9, 11 are joined by a supporting element 79. The supporting element 79 (FIG. 12) may include retaining means cooperating by elastic fastening with the bodies of the hydraulic connections 9, 11. The supporting element 79 includes openings 81 for the inlets 43, 49 and outlets 45, 47, 51, 53 of the hydraulic connections 9, 11. Furthermore, to strengthen the attachment of the supporting element 79 to the hydraulic connectors 9, 11, the supporting element 79 may include apertures 83 cooperating by elastic fastening with the corresponding protuberances 73 (visible for example in FIG. 7b) of the bodies of the hydraulic connections.

The supporting element 79 holds the bodies of the hydraulic connections at a distance d (shown in FIG. 9). The supporting element 79 also includes a central open cavity 85 (FIG. 12) located between the two bodies of the hydraulic connections 9, 11 at the junction zone 41. This central cavity 85 has openings 87 enabling the faces 37, 39 of the hydraulic connection 9, 11 to be uncovered and a side orifice 89 enabling the cavity 85 to be opened outwards. As shown in FIG. 9, the section of the heat-conducting tab 57 substantially compliments the section of the side orifice 89, and as such the heat-conducting tab 57 can be inserted into the cavity 85.

The thickness e of the heat-conducting tab 57 is substantially equal to the distance d between the bodies of the hydraulic connections 9, 11. Furthermore, the shape of the heat-conducting tabs 57 substantially complements the shapes of the faces 37, 39 of the hydraulic connections 9, 11. Thus, the walls 75, 77 of the tab are in contact with the bodies of the hydraulic connections 9, 11 at the faces 37, 39 of same.

The heat-conducting tab 57 thus enables a uniform diffusion of the heat at the junction zone 41. This improves the heating of the hydraulic connections 9, 11 by preventing the formation of hotspots that could damage same. As a variant, the cavity 85 may be filled with heat-conducting adhesive or resin to improve the heat transfer between the heat-conducting tab 57 and the hydraulic connections 9, 11. This heat-conducting adhesive or resin may be positioned in the cavity before insertion of the heat-conducting tab 57 or be injected after said tab 57 has been positioned.

During the assembly method of the heating device according to a second embodiment 200 (FIG. 11), the following succession of steps can be carried out.

In a first step 201, the two heating conductors 25, 27 extending outside the sleeve 17 are connected together using shunts. The heating device 23 is thus closed electrically, thereby forming the conductive heating loop 29.

In a second step 202 (FIG. 10), the conductive heating loop 29 is wrapped up such as to form the heat-conducting tab 57.

In a third step 203, in the single-line variant, the heat-conducting tab 57 is arranged against the body of the hydraulic connection 9 by means of a specific supporting element 79 and the circulation channel 19 of the main under-hood pipe 7 is connected to the hydraulic connection 9.

In the two-line variant, during an alternative third step 203, the hydraulic connections 9, 11 are assembled using the supporting element 79 (FIG. 12) by fitting the supporting element 79 onto the side walls 33, 35 of the bodies of the hydraulic connections 9, 11.

The heat-conducting tab 57 is then inserted between the hydraulic connections 9, 11, in the cavity 85 of the supporting element 79 (FIG. 13) and the circulation channels 19 or 21 of the main under-hood pipe 7 are connected to the inlets 43 or 49 of the hydraulic connections 9 or 11. The walls 75, 77 of the tab fit the faces 37, 39 of the bodies of the hydraulic connections 9, 11 arranged facing one another. The heating device 23 according to the second embodiment assembled with the distribution system is shown in FIG. 14.

In a fourth step 204, the protective mask 65 is fitted onto the body of the at least one hydraulic connection, the inlets 43, 49 and outlets 45, 47, 51, 53 of the at least one hydraulic connection 9, 11 being slid into the openings 81.

Finally, in a fifth step 205, the at least one hydraulic connection 9, 11 is assembled with the housing 31. The distribution device 1 connected thus is attached to the motor vehicle. It is then simply a matter of connecting the secondary windscreen wiper pipes 13, 15 to the at least one hydraulic connection 9, 11 and electrically connecting the heating conductors 25, 27 of the main under-hood pipe 7 to the electricity supply connector of the housing 31.

As a variant, the protective mask 65 can be positioned after the at least one hydraulic connection 9, 11 has been attached to the housing 31.

This assembly method is simple and quick to implement.

Naturally, according to a variant not shown, the heating conductors 25, 27 forming the conductive heating loop 29 can be embedded in one of the secondary windscreen wiper pipes 13 and 15.

A heating device 23 including a heat-conducting adapter 55, 57 such as a heat-conducting ring 55 or a heat-conducting tab 57 in contact firstly with the heating loop 29 and secondly with the at least one hydraulic connection 9, 11 enables the simple and quick assembly of the heating device 23 with the washer fluid distribution system 1.

Furthermore, the heat-conducting adapter 55, 57 includes a portion of wall 75, 77 fitting the shape of the at least one hydraulic connection 9, 11, which helps to improve heating and to keep the junction zone between the primary pipe and the secondary pipes ice free. This improvement is attributable firstly to efficient heat transfer and secondly to uniform heat transfer, which helps to prevent the formation of hotspots that could damage the at least one hydraulic connection 9, 11.

Naturally, the conductive heating adapter, which may be a heat-conducting ring 55 or a heat-conducting tab 57 as described above, is not necessarily in contact with the at least one hydraulic connection 9, 11. Nonetheless, the conductive heating adapter used must be at a suitable distance to transmit at least some of the heat from said adapter to said at least one hydraulic connection 9, 11. Preferably, this distance is between 0 and 5 millimeters and, according to a preferred variant, the distance is between 0 and 1 millimeter. This arrangement is particularly advantageous when using a mask to insulate the conductive heating adapter from the external environment.

The invention claimed is:

1. A system for distributing washer fluid for motor vehicle windscreen wipers, comprising:
    at least two fluid circulation pipes;
    at least one heating element extending along said at least two fluid circulation pipes, wherein said at least one heating element includes two separate heating conductors connected to one another to form a conductive heating loop;
    at least two hydraulic connections connected hydraulically to said at least two fluid circulation pipes; and
    a heat-conducting adapter in contact with said two separate heating conductors at a first end and arranged at a suitable distance to transmit at least some of a heat from said heat-conducting adapter to said at least two hydraulic connections,
    wherein the heat-conducting adapter is a heat-conducting tab wrapped around the conductive heating loop, and herein a supporting element connects the two hydraulic connections, and the heat-conducting adapter having a second end that is inserted between two opposing faces of the at least two hydraulic connections at a cavity of a junction zone in said supporting element to enable the heat to be diffused efficiently from the conductive heating loop to the at least two hydraulic connections.

2. The system for fluid distribution as claimed in claim 1, wherein said suitable distance between the heat-conducting adapter and said at least two hydraulic connections are between and 5 millimeters.

3. The system for fluid distribution as claimed in claim 1, wherein the heat-conducting adapter includes a wall portion fitting at least one portion of a body of said at least two hydraulic connections.

4. The system for fluid distribution as claimed in claim 1, wherein the two separate heating conductors are partially embedded in a mass forming said at least two fluid circulation pipes, said conductive heating loop extending outside said at least two fluid circulation pipes.

5. A system for fluid distribution for motor vehicle windscreen wipers comprising:
- at least two fluid circulation pipes;
- at least one heating element extending along said at least two fluid circulation pipes, wherein said at least one heating element includes two separate heating conductors connected to one another to form a conductive heating loop;
- at least two hydraulic connections connected hydraulically to said at least one two fluid circulation pipes; and
- a heat-conducting adapter in contact with said two separate heating conductors at a first end and arranged at a suitable distance to transmit at least some of a heat from said heat-conducting adapter to said at least two hydraulic connections, wherein the heat-conducting adapter is a heat-conducting ring about which the conductive heating loop is wound, and wherein a supporting element connects the two hydraulic connections, and the heat-conducting adapter having a second end that is inserted between two opposing faces of the at least two hydraulic connections at a cavity of a junction zone in said supporting element to enable the heat to be diffused efficiently from the conductive heating loop to the at least two hydraulic connections.

6. The system for fluid distribution as claimed in claim 5, wherein the heat-conducting ring is covered by an insulating joint at least about the conductive heating loop.

7. The system for fluid distribution as claimed in claim 1, wherein the heat-conducting tab is made of a heat-conducting resin.

8. The system for fluid distribution as claimed in claim 1, wherein a protective mask covers the heat-conducting adapter as well as a side wall of the at least two hydraulic connections.

9. The system for fluid distribution as claimed in claim 5, wherein the heat-conducting ring is fitted into a body of the two hydraulic connections at the junction zone.

* * * * *